June 6, 1961

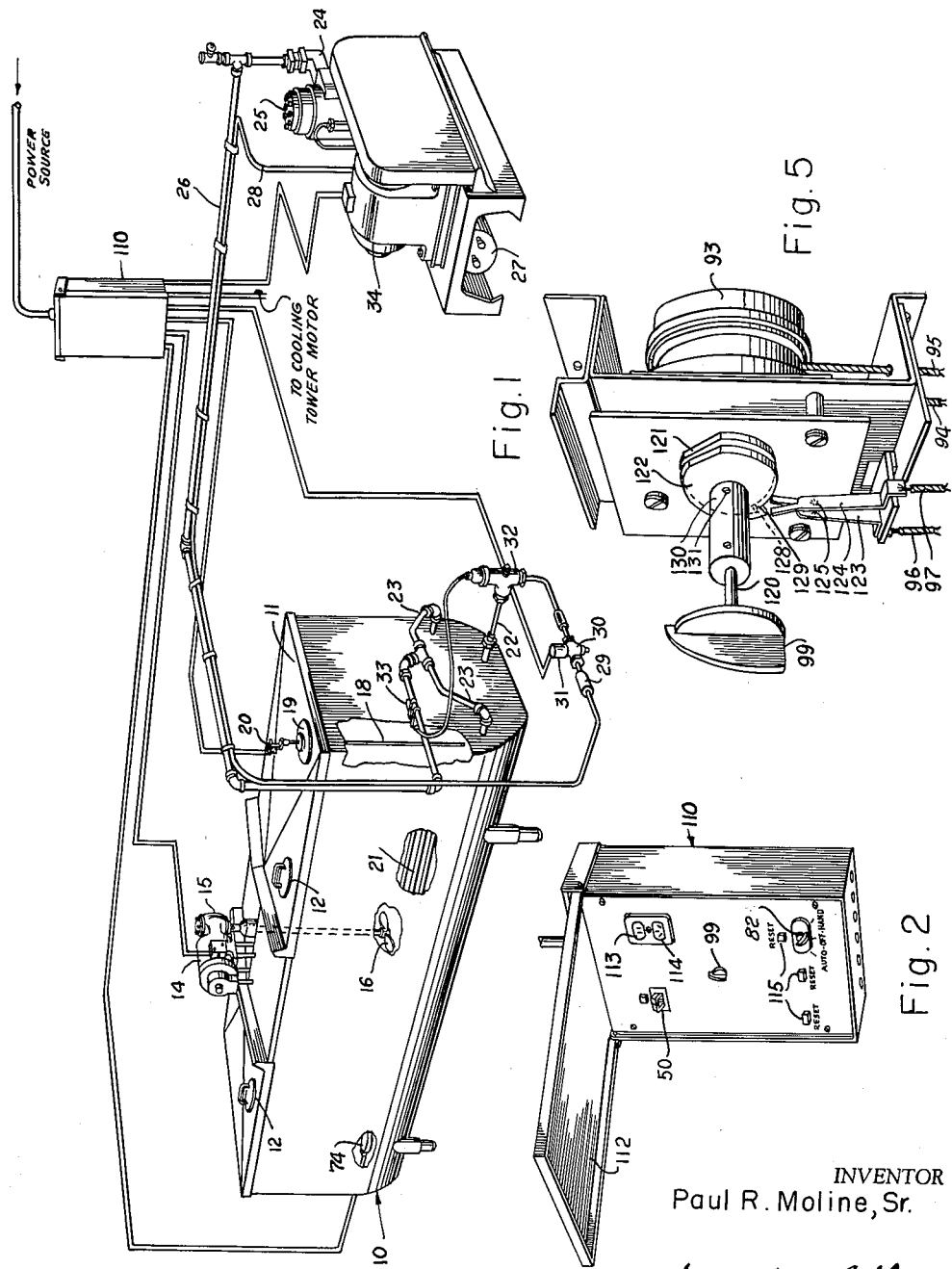

P. R. MOLINE, SR 2,986,895

APPARATUS FOR COOLING AND AGITATING LIQUIDS
TO PREVENT STRATIFICATION

Filed Dec. 3, 1956

INVENTOR
Paul R. Moline, Sr.

BY *Hastings Ackley*

ATTORNEY

United States Patent Office 2,986,895
Patented June 6, 1961

2,986,895
APPARATUS FOR COOLING AND AGITATING LIQUIDS TO PREVENT STRATIFICATION
Paul R. Moline, Sr., Fort Worth, Tex., assignor to General Industrial Supply Corporation, Fort Worth, Tex., a corporation of Texas
Filed Dec. 3, 1956, Ser. No. 625,991
8 Claims. (Cl. 62—129)

This invention relates to liquid handling methods and apparatus therefor, and more particularly to a method for handling fluids which must be preserved at controlled temperatures and agitated to prevent stratification, and to an apparatus for preserving fluids at a controlled temperature and agitating the same to prevent stratification.

An object of the invention is to provide a method for maintaining in proper condition a fluid which is subject to deterioration when maintained above a certain temperature and to stratification.

Another object of the invention is to provide a method for maintaining a body of fluid at a uniform temperature at all parts throughout the body and in a homogeneous condition.

Still another object is to provide a method of handling milk which includes introducing the milk into a container; maintaining the body of milk in the tank at a predetermined desired temperature; stirring the milk to prevent statification thereof and to assure uniform temperature throughout the body of the milk; and effectuating the temperature control and stirring operations when the level of the liquid in the container is at a predetermined height.

Still another object is to provide a new and improved apparatus for handling milk which includes the provision of a refrigerant means for maintaining the temperature of the milk in a tank at a predetermined level and providing a stirring means for agitating the milk in the tank to prevent stratification thereof and also to assure uniform temperature conditions throughout the body of the milk.

Another object of the invention is to provide an apparatus for handling milk, of the type described, which includes means for controlling the starting of the refrigerant means and the stirring means in accordance with the level of the milk in the container.

Still another object is to provide a milk handling apparatus, of the type described, wherein the stirring means is energized at predetermined intervals to maintain the milk in the tank uniformly cool and to prevent stratification thereof.

A still further object is to provide a milk handling apparatus, of the type described, wherein the refrigerant means and the stirring means are prevented from operating until a pre-set minimum level of milk is present in the tank.

Additional objects and advantages of the invention will readily be apparent from the reading of the following description of the method of the invention and of a device for carrying out the same, and reference to the accompanying drawings thereof, wherein:

FIGURE 1 is a schematic representation of an apparatus for handling milk by the method of the invention;

FIGURE 2 is a perspective view of an electrical control box which forms a part of the apparatus shown in FIGURE 1 showing the cover thereof raised to an open position;

FIGURE 5 is an enlarged perspective view of the timer motor and switch.

Figure 4:
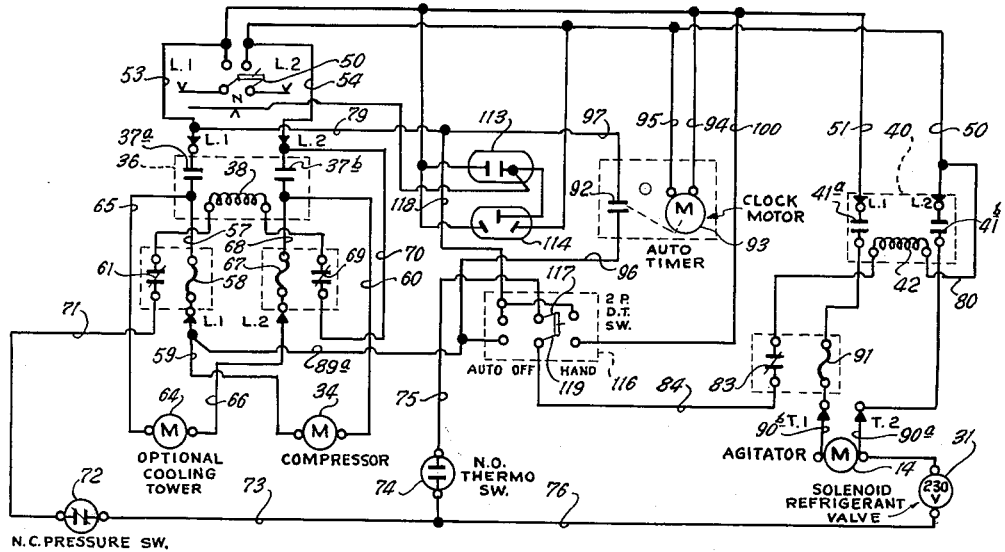
FIGURE 4 is a schematic illustration of a modified form of the electric circuit employed in the apparatus shown in FIGURE 1, without the liquid level sensing switch.

Referring now to the drawings, the apparatus for handling milk includes a tank 10 provided with a suitable cover 11 and having inlet apertures each covered with a lid 12. A motor 14 is mounted on the cover 11 of the tank and is connected through a suitable speed reducing means 15 to an agitator 16 which is rotatable about a vertical axis and which extends to a position adjacent the lower end of the tank. A liquid level sensing device 18 may be mounted on the cover 11 to extend slidably through a fitting 19 of the cover 11. The sensing device 18 actuates a switch 20, FIGURE 3, whenever the level of the liquid in the tank 10 rises to a predetermined height in the tank.

The tank is provided with a plurality of tubes or passages 21 along its internal walls, not shown, through which a refrigerant, such as Freon, is circulated to cool the tank and the contents thereof. The refrigerant is circulated into these passages through an inlet conduit 22 and is withdrawn from such passages through the outlet conduits 23 which are connected to the inlet 24 of a compressor 25 through suitable pipe 26. The outlet of the compressor 25 is connected to a suitable reservoir tank 27 in the usual manner; and the outlet of the reservoir tank 27 is connected through suitable pipes 28 to the inlet pipe 22 through a dehydrator 29, a valve 30 operated by a solenoid 31 and a thermostatic expans.on valve 32 which is controlled by the usual thermostatic expansion valve bulb 33 which senses the temperature of the expanded refrigerant gas passing from the outlet conduits 23 to the inlet 24 of the compressor.

The compressor motor 34 is controlled by a relay 36 (FIGURES 3 and 4) having two pairs of contacts 37a and 37b which are closed by the relay winding 38 when it is energized. Similarly, the agitator motor 14 is energized through a relay 40 having two pairs of contacts 41a and 41b which are closed when the relay winding 42 is energized.

Figure 3:
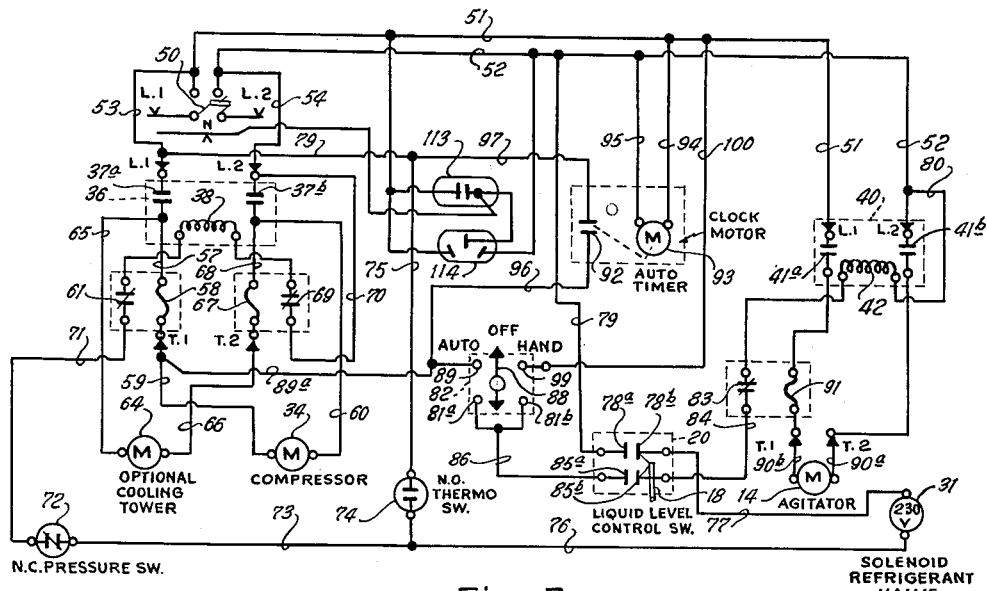
FIGURE 3 is a schematic illustration of the electrical circuit employed in the apparatus shown in FIGURE 1, including a liquid level sensing switch.

Referring now particularly to FIGURE 3, the electrical circuit for energizing the compressor motor 34 and the agitator motor 14 includes a main switch 50 for connecting the main power conductors 51 and 52 to the electrical source L1 and L2, respectively. One contact of each pair of contacts 37a and 37b of the relay 36 are connected to the conductors 51 and 52 by conductors 53 and 54, respectively. The other contact of the pair of contacts 37a is connected to the compressor motor 34 through a conductor 57, a heater element 58 and a conductor 59. The other contact of the pair of contacts 37b is connected to the other side of the compressor motor 34 through the electrical conductor 60. The heater element 58 is operatively associated with a normally closed switch 61 which opens when heated to a predetermined temperature by the heater element 58. This occurs only if the compressor motor is subjected to an overload and draws an excessive current through the heater element 58.

A cooling tower motor 64 is provided if the outlet of the compressor 25 is connected to condenser coils, not shown, which are sprayed with water in the cooling tower by the operation of the cooling tower motor in the usual manner. If the cooling tower motor is employed, it is connected to one of the contacts 37a through a conductor 65 and to one of the contacts 37b through a conductor 66, a heater element 67, and a conductor 68. The heater element 67 is operatively associated with a normally closed switch 69 which opens when heated to a predetermined temperature by the heater element 67. This occurs only if the cooling tower motor is subjected to an overload and draws an excessive current through the heating element 67.

The relay winding 38 is connected across the conductors 51 and 52 through conductors 54 and 70, the overload switch elements 69 and 61, the conductor 71, a normally closed pressure switch 72 which is responsive to the pressure in the reservoir tank 27 of the compressor 25, the conductor 73, a normally open thermostatic switch 74 which is disposed within the tank 10 and is responsive to the temperature of the milk within the tank, a conductor 75, a conductor 79, and the conductor 53. Thus, it will be seen that whenever the main switch 50 is closed, the compressor motor 34 and the cooling tower motor 64 will operate whenever the temperature within the tank rises above a predetermined value and causes the thermostatic switch 74 to close, provided that the pressure within the reservoir tank 27 does not exceed the predetermined value at which the pressure switch 72 opens. When the thermostatic switch 74 and the pressure switch 72 are in closed positions, the relay winding 38 is energized and causes the contacts 37a and 37b to move to closed positions. Thus, the compressor motor will "pump down" the refrigerating system when the main switch is closed if the pressure within the reservoir tank 27 is below the predetermined value and the temperature within the tank 10 is above the predetermined value. This condition exists when the apparatus is initially placed in operation.

The solenoid 31 which opens the refrigerant valve 30 when it is energized has one side connected to the normally open thermostatic switch 74 by a conductor 76, and its other side is connected to the conductor 52 through the conductor 77, the contacts 78a and 78b of the liquid level sensing switch 20 and a conductor 79. It will be seen that the solenoid 31 will be energized whenever the temperature of the liquid in the tank exceeds the predetermined value at which the normally open thermostatic switch 74 closes and the level of the liquid in the tank 10 rises to the predetermined level to cause the contacts 78a and 78b of the liquid level sensing switch to close.

The relay winding 42 of the relay 40 has one side connected to the conductor 52 by a conductor 80 and has its other side connected to a pair of contacts 81a and 81b of a manually operable switch 82 through a normally closed switch 83, a conductor 84, the contacts 85a and 85b of the liquid level responsive switch 20 and a conductor 86. The liquid level responsive switch thus has two sets of contacts 78a and 78b and 85a and 85b which close whenever the level of the liquid exceeds a predetermined height. The contacts may be actuated by the sensing device 18 which may comprise a float located in the tank 10 or a relay winding which is connected across the conductors 51 and 52 by the liquid itself when it rises above a pair of contacts disposed in the tank 10.

The movable contact 88 of the switch 82 connects the contact 81b to a contact 89 whenever the switch 82 is in its automatic position and thus connects the conductor 86 to the conductor 59 through another conductor 89a. Thus, it will be seen that whenever the compressor motor and the cooling tower motor are operating the relay winding 42 is energized when the level of liquid in the tank exceeds a predetermined height, since the relay winding is connected to the conductors 51 and 52 through the conductor 80, the closed switch 83, the conductor 84, the switch 20 when it is closed, the conductor 86, the contact 88, the conductor 89a, the heater element 58, the contacts 37a of the relay 36, and the conductor 53.

It will thus also be seen that even if the temperature of the milk exceeds the predetermined value and the thermostatic switch 74 is closed, the solenoid 31 can be energized only when the switch 82 is in its automatic position and only when the switch 20 is closed, which occurs when the level of the milk in the tank 10 exceeds a predetermined height. This insures that if only a small quantity of milk is in the tank, it will not freeze on the cooled walls of the tank.

The agitator motor 14 is connected across the conductors 52 and 51 whenever the contacts 41a and 41b of the relay 40 are closed, which occurs when the relay winding 42 is energized, by the contacts 41b, the conductors 90a and 90b, a heater element 91 which is operably associated with the normally closed switch 83 which opens when heated to a predetermined temperature by the heater element 91, and the contacts 41a. The relay winding 42 may also be connected across the main conductors 51 and 52, when the switch 82 is in the automatic position and the switch 20 is closed, by a switch 92 which is actuated by a clock motor 93 connected across the main conductors 51 and 52 by the conductors 94 and 95. The clock motor 93 closes the switch 92 at periodic intervals for predetermined periods of time, whenever the main switch 50 is in closed position energizing the main conductors 51 and 52, to effect periodic energizing of the agitator. When the switch 92 is closed, the relay winding 42 is connected across the conductors 51 and 52 by the conductor 80, the normally closed switch 83, the conductor 84, the contacts 85a and 85b of the switch 20, the conductor 86, the movable contact 88 of the switch 82, the conductor 96, the conductor 97, the conductor 79 and the conductor 53.

Assuming now that the tank 10 is empty, that the main switch 50 is closed, and that the thermostatic switch 74 is closed since the temperature in the tank is normally above the predetermined value when it is empty, the compressor motor 34 and the cooling tower motor 64 will be energized and will operate until the pressure in the reservoir tank 27 of the compressor reaches the value at which the pressure switch 72 opens because the relay winding 38 is now connected across the main conductors 51 and 52. The solenoid 31, however, is not energized and the refrigerant valve 30 remains closed, preventing flow of the refrigerant to the cooling pipes of the tank 10, since the liquid level switch 20 is open and thus prevents energization of the relay winding 42 and the closing of the relay contacts 41a and 41b. The compressor motor therefore pumps down the cooling system to place the refrigerating system in condition for immediate operation to cool the tank 10 when milk is introduced into the tank. The agitator motor 14 also cannot operate until the switch 20 closes.

If the movable contact 88 of the switch 82 is moved to automatic position and if warm milk is now introduced into the tank 10, the liquid level switch will close when a predetermined minimum amount of milk is in the tank. The thermostatic switch will now be closed, since the milk is warm and above a predetermined cool temperature. As a result, the solenoid 31 is energized to open the refrigerant valve 30 which allows the refrigerant from the reservoir tank 27 to enter through the inlet 22 into the cooling pipes of the tank, whereby the milk is cooled.

The cooling of the milk now continues with all portions of the body of milk in the tank being cooled uniformly due to the action of the agitator 16. When the milk is cooled below the predetermined low temperature, the thermostatic switch 74 opens and the relay winding 38 is de-energized. As a result, the contacts 37a and 37b open, stopping further operation of the compressor motor 34 and the cooling tower motor. The agitator motor, of course, operates as long as the compressor motor operates, if the tank contains enough milk to keep the switch 20 closed.

The clock motor 93 runs continuously as long as the main switch 50 is closed and periodically closes the switch 92 for predetermined intervals of time. Each time the switch 92 closes, the relay winding 42 is energized, since the tank contains sufficient milk to keep the switch 20 closed. The agitator motor is thus energized periodically to rotate the agitator 16, even if the compressor motor 34 is not in operation.

Once the tank is filled with milk and the refrigerating and stirring process is begun, the pressure switch stays closed since the thermostatic switch 74 opens each time the temperature of the milk drops below the predetermined value and stops operation of the compressor motor simultaneously with the de-energization of the solenoid 31 so that the pressure in the reservoir tank 27, once the process is commenced and the level of the liquid is high enough to keep the switch 20 closed, can never rise to the degree which would open the pressure switch 72 in normal operation of the system.

Thus, each time the thermostatic switch 74 closes, the relay winding 38 is energized and the compressor motor is placed in operation. When the relay winding 38 is energized and closes the contacts 37a, the relay winding 42 is also energized and thus places the agitator motor 14 in operation.

If it is desired to energize the agitator at any other time, the movable control of the switch 82 may be moved to the hand position wherein the contact 88 abuts the contacts 81a and 99 so that the relay winding 42 is connected across the main conductors 51 and 52 through the conductor 80, the switch 83, the conductor 84, the contacts 85a and 85b of the liquid level sensing switch 20, the conductor 86, the movable contact 88 of the switch 82 and the conductor 100. The agitator motor will now run until the switch 82 is moved to the off position or until the level of the liquid in the tank drops enough to open the switch 20. The compressor motor 34 and the solenoid 31 will operate in the same manner as when the movable contact 88 is in the automatic position, since the movable contact 88 of the switch 82 when in the automatic position merely ensures that the agitator motor is energized each time the compressor motor is energized and each time the switch 92 is closed.

The switches 50 and 82 and the relays 36 and 40 may be located in a case or housing 110 provided with a hinged front cover 112 which protects the contents of the case from entry of water. A pair of plug receptacles 113 and 114 may also be provided for supplying other electrically operated machinery with current of the appropriate voltage. Reset buttons 115 may be provided in the case for resetting the overload switches 61, 69 and 83.

It will now be seen that a new and improved apparatus for handling liquids, such as milk, has been illustrated and described which includes a tank for receiving the liquid, a refrigerating means for cooling the liquid in the tank, an agitating means for agitating or stirring the liquid and a control means for operating the refrigerating means when the temperature of the liquid falls below a predetermined value but only when the level of the liquid in the tank is above a predetermined level to prevent excessive cooling or freezing of the liquid which might occur if the amount of the liquid in the tank is below a minimum amount, for operating the agitating means whenever the refrigerating means operates, and for operating the agitating means periodically without regard to the operation of the refrigerating means when the level of the liquid is above the predetermined level.

It will thus be seen that the liquid is never caused to froth which would break down the butter fat and cause a churning action since the agitator 16 never operates unless the liquid level is at such a height in the tank that the agitator is submerged therein, that the liquid is prevented from stratifying by the periodic operation of the agitating means, and the uniform cooling of the liquid is obtained whenever the refrigerating means is operated since the agitator means always operates when the refrigerating means operates.

It will also be apparent that the new method of maintaining bodies of liquid, such as milk, in a proper condition includes introducing the body of liquid into a container or tank having means for cooling the liquid, agitating the liquid periodically to prevent stratification of the liquid, maintaining the temperature of the liquid below a predetermined value by operating the cooling means whenever the temperature of the liquid rises above the predetermined value, and agitating the liquid whenever the cooling means is in operation.

It will also be apparent that since the normally closed switches 61 and 69 are connected in series with the relay winding 38, opening of either of these switches which would occur if either the cooling tower motor 64 of the compressor motor 34 were overloaded, will cause the contacts 37a and 37b to open and will thus prevent operation of both motors whenever either the cooling tower motor or the compressor motor fails.

The electric circuit illustrated in FIGURE 4 is identical to the one illustrated in FIGURE 3 with the exception that the liquid level sensing device 18 and the switch 20 are omitted and the switch 82 is replaced by a double pole double throw switch 116. The compressor motor 34 and the cooling tower motor 64 will not operate when the main switch 50 is closed if the switch 116 is in its off position since the conductor 75 is connected to the movable control 117 of the switch 116 and is connected to the conductor 79 by the conductor 118 only when the movable control 117 is either in the automatic position or in the hand position.

The compressor motor 34 and the cooling tower motor 64 will now operate whenever both the pressure switch 72 and the thermostatic switch 74 are closed since the relay winding 38 will be connected across the main conductors 51 and 52 through the conductors 54 and 70, the closed switches 69 and 61, the conductor 71, the pressure switch 72, the conductor 73, the thermostatic switch 74, the conductor 75, the movable control 117 and the conductors 118, 97 and 53.

The agitator motor 14 will be energized when the switch 116 is in the automatic position each time the compressor motor 34 is energized because the relay winding 42 is then connected across the main conductors 51 and 52 through the conductor 80, the normally closed switch 83, the conductor 84, the movable control 119 of the switch 116, the conductor 89a, the heater element 58, the conductor 57, the contacts 37a and the conductor 53. The agitator motor 14 will also be energized periodically when the switch 116 is in the automatic position regardless of the energization of the compressor motor since its relay winding 42 will be connected across the main conductors each time the switch 92 is closed by the clock motor 93 through the conductors 53, 79 and 97, the switch 92, the conductor 96, the movable contact 119, the conductor 84, the closed switch 83 and the conductor 80.

The solenoid valve 30 will be opened by energization of the solenoid 31 whenever the temperature of the milk in the tank rises above the predetermined value and the thermostatic switch 74 closes since each time the thermostatic switch 74 closes, the relay windings 38 and 42 are energized as described above, and the solenoid 31 is then connected across the main conductors 51 and 52 through the contacts 41b of the starter 40, the conductors 90a and 76, the thermostatic switch 74, the conductor 75, the movable contact 117 of the switch 116, and the conductors 118, 79 and 53.

Thus, it will be seen that the agitator motor 14 is operating whenever the solenoid valve 30 is open and cooling of the liquid in the tank is taking place. It will also be seen that the agitator motor 14 operates periodically due to the periodic closing of the switch 92 regardless of whether the compressor motor or the solenoid 31 are operating.

If it is desired to operate the agitator motor without regard to either the time factor or the operation of the cooling system, as when it is desired to secure a sample, the switch 116 is moved to the hand position and the relay winding 42 is then connected across the main conductors 51 and 52 through the conductor 80, the closed switch 83, the conductor 84, the movable contact 119, and the conductor 100.

The compressor motor and the solenoid 31 will be energized as before each time the temperature within the tank rises to the predetermined value and the thermostatic switch 74 closes for the movable contact 117 again connects its conductors 75 and 89a when the switch 116 is in the hand position.

The timer motor 93, FIGURE 5, may be provided with a driven shaft 120 on which are adjustably secured two cams 121 and 122 which are adapted to engage the free ends of the leaf springs 123 and 124, respectively. The leaf springs are made of a conductive resilient substance and have connected to their lower ends the conductors 96 and 97. The leaf springs are provided with contacts 125 which are brought into abutting relation to each other to effect an electrical connection between the conductor 96 and 97. The cams 121 and 122 are provided with non-conducting peripheral cam surfaces which engage the upper free ends of the leaf springs 123 and 124, respectively, to move the upper ends of the leaf springs toward the left, FIGURE 5. The cam surfaces end abruptly as at 128 and 129 at which points the leaf springs 123 and 124, respectively, each disengage from the cam surfaces as the cams revolve therepast. The contacts 125 are apart or separated when the upper ends of the leaf springs are not engaged by the cams as in the positions shown in FIGURE 5.

As the shaft 120 is rotated in a clockwise direction (FIGURE 5) by the motor 93, the peripheral cam 121 engages the upper end of the leaf spring 123 and moves it to the left away from the leaf spring 124. Then the peripheral surface of the cam 122 engages the upper end of the leaf spring 124 and also moves it to the left but not enough to cause the contacts 125 to engage. As the shaft 120 continues to rotate, the end or step 128 of the cam surface of the cam 121 moves past the upper end of the leaf spring 123 which spring then moves with a snap action to the right toward the leaf spring 124 and causes the contacts 125 of the leaf springs to engage with a snap action. As the shaft continues to rotate the end or step 129 of the cam 122 moves past the upper end of the leaf spring 124 which spring then moves with a snap action to the right away from the leaf spring 123 and causes the contacts 125 to disengage or break contact with a snap action.

It will be apparent that the period of time, during each rotation of the shaft 120, during which the contacts 125 are held in engagement, is determined by the relative position of the ends or steps 128 and 129 of the peripheral cam surfaces of the cams 121 and 122, respectively, and that the closer the steps are to one another the shorter the period of time the agitator is energized during each revolution of the shaft 120. The cam 122 may be adjustably but rigidly mounted on the shaft 120 by means of a bushing 130 to which said cam is rigidly secured, as by welding, and a set screw 131. The cam 121 may be mounted on a bushing (not shown) which may be rigidly secured to the shaft 120 by set screws (not shown). Thus, by loosening the set screw 131 the cam 122 may be rotated on the shaft 120 relative to the cam 121 to vary the distance between the steps 128 and 129 of the two cams.

An override mechanism or friction drive, not shown, may be interposed between the shaft 120 and the drive shaft of the motor 93 so that the agitator motor may be energized for a predetermined period of time whenever it is so desired by manually rotating the shaft 120 by means of the handle 99 until step 128 of the cam 121 is moved past the upper end of the leaf spring 123 and the contacts 125 engage.

The foregoing description of the invention is explanatory only, and changes in the details of the method described and construction illustrated may be made by those skilled in the art, within the scope of the appended claims, without departing from the spirit of the invention.

What is claimed and desired to be secured by Letters Patent is:

1. An apparatus, of the type described, comprising: a tank for holding liquid; cooling means for lowering the temperature of the liquid in the tank; an agitator in the tank for agitating the liquid, control means for operating the cooling means whenever the temperature of the liquid rises above a predetermined value and for operating the agitator means whenever the cooling means is operating to prevent freezing thereof; and control means for preventing operation of the cooling means and the agitating means whenever the level of the liquid in the tank falls below a predetermined level.

2. An apparatus for storing a liquid subject to stratification comprising: a tank for holding liquid; cooling means for lowering the temperature of the liquid in the tank; an agitator in the tank for agitating the liquid, control means for operating the cooling means whenever the temperature of the liquid rises above a predetermined value and for operating the agitator means whenever the cooling means is operating to prevent freezing of the liquid; and automatic means for operating the agitating means at predetermined intervals for predetermined periods of time independently of said cooling means to prevent stratification of the liquid.

3. An apparatus, of the type described, comprising: a tank for holding liquid; cooling means for lowering the temperature of the liquid in the tank; an agitator in the tank for agitating the liquid; control means for operating the cooling means whenever the temperature of the liquid rises above a predetermined value and for operating the agitator means whenever the cooling means is operating to prevent freezing of the liquid; control means for preventing operation of the cooling means and the agitating means whenever the level of the liquid in the tank falls below a predetermined level; and automatic means for operating the agitating means at predetermined intervals for predetermined periods of time independently of said cooling means whenever the level of the liquid in the tank is not below said predetermined level.

4. An apparatus, of the type described, including: a tank; cooling ducts in the tank; a compressor connected to the cooling ducts for circulating a refrigerant fluid therethrough; a valve connected between the compressor and the cooling ducts for controlling flow of refrigerant to the cooling ducts; a first electrically operated means for opening said valve, and a second electrically operated means for operating said compressor; an agitator for agitating liquid contained in the tank; a third electrically operated means for operating said agitator; means responsive to the temperature of the liquid; means responsive to said temperature responsive means for energizing said first, second and third electrically operated means when the temperature of the liquid rises above a predetermined value; automatic means for energizing said third electrically operated means at periodic time intervals; and means responsive to the level of the liquid to prevent energization of said first and third electrically operated means when the level of the liquid falls below a predetermined height in the tank.

5. An apparatus for storing liquids subject to stratification comprising: a tank for holding liquid; cooling means for lowering the temperature of the liquid in the tank; an agitator in the tank for agitating the liquid; control means for operating the cooling means whenever the temperature of the liquid rises above a predetermined value and for operating the agitator means whenever the cooling means is operating to prevent freezing of the liquid; and automatic means for operating the agitating means at predetermined intervals independently of said cooling means to prevent stratification of the liquid; said last mentioned means including a switch and means for periodically closing said switch for predetermined periods of time.

6. In an apparatus of the type described, having a tank for holding liquid, cooling means for lowering the temperature of the liquid in the tank and an agitator in the tank for agitating the liquid, the improvement which includes: control means for operating the cooling means whenever the temperature of the liquid rises above a predetermined value and for operating the agitator means whenever the cooling means is operating to prevent freezing of the liquid, said control means preventing operation of the cooling means and the agitating means whenever the level of the liquid in the tank falls below a predetermined level.

7. In an apparatus of the type described, having a tank for holding liquid, cooling means for lowering the temperature of the liquid in the tank and an agitator in the tank for agitating the liquid, the improvements which include: control means for operating the cooling means whenever the temperature of the liquid rises above a predetermined value and for operating the agitator means whenever the cooling means is operating to prevent freezing of the liquid, said control means preventing operation of the cooling means and the agitating means whenever the level of the liquid in the tank falls below a predetermined level; and automatic means for operating the agitating means at predetermined intervals independently of said cooling means when the level of the liquid in the tank is not below said predetermined level.

8. In an apparatus of the type described, having a tank for holding liquid, cooling means for lowering the temperature of the liquid in the tank and an agitator in the tank for agitating the liquid, the improvements which include: control means for operating the cooling means whenever the temperature of the liquid rises above a predetermined value and for operating the agitator means whenever the cooling means is operating to prevent freezing of the liquid, said control means preventing operation of the cooling means and the agitating means whenever the level of the liquid in the tank falls below a predetermined level; and automatic means for operating the agitating means at predetermined intervals independently of said cooling means when the level of the liquid in the tank is not below said predetermined level; said last mentioned means including a switch and means for periodically closing said switch for predetermined periods of time.

References Cited in the file of this patent

UNITED STATES PATENTS

| | | |
|---|---|---|
| 2,055,022 | Wood | Sept. 22, 1936 |
| 2,145,331 | Arensberg | Jan. 31, 1939 |
| 2,166,158 | Kalischer | July 18, 1939 |
| 2,185,965 | Newell | Jan. 2, 1940 |
| 2,289,645 | Geistert | July 14, 1942 |
| 2,358,756 | Zoller et al. | Sept. 19, 1944 |
| 2,488,435 | Ritter | Nov. 15, 1949 |
| 2,559,032 | Tacchella | July 3, 1951 |
| 2,644,322 | Preble et al. | July 7, 1953 |
| 2,740,264 | Thompson | Apr. 3, 1956 |
| 2,746,260 | Swenson | May 22, 1956 |
| 2,803,952 | Setzekorn et al. | Aug. 27, 1957 |
| 2,810,350 | MacWilliams | Oct. 22, 1957 |
| 2,817,214 | Swenson et al. | Dec. 24, 1957 |
| 2,824,431 | Pearson | Feb. 25, 1958 |
| 2,824,432 | Varese et al. | Feb. 25, 1958 |